US009124773B2

(12) United States Patent
Chan et al.

(10) Patent No.: US 9,124,773 B2
(45) Date of Patent: Sep. 1, 2015

(54) ELEMENTARY BITSTREAM CRYPTOGRAPHIC MATERIAL TRANSPORT SYSTEMS AND METHODS

(71) Applicant: Sonic IP, Inc., San Diego, CA (US)

(72) Inventors: Francis Yee-Dug Chan, San Diego, CA (US); Kourosh Soroushian, San Diego, CA (US); Andrew Jeffrey Wood, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

(21) Appl. No.: 14/306,146

(22) Filed: Jun. 16, 2014

(65) Prior Publication Data

US 2014/0376720 A1    Dec. 25, 2014

Related U.S. Application Data

(63) Continuation of application No. 12/946,631, filed on Nov. 15, 2010, now Pat. No. 8,781,122.

(60) Provisional application No. 61/266,982, filed on Dec. 4, 2009.

(51) Int. Cl.
*H04L 29/06* (2006.01)
*H04N 7/167* (2011.01)
(Continued)

(52) U.S. Cl.
CPC .......... *H04N 7/1675* (2013.01); *H04L 63/0428* (2013.01); *H04L 65/607* (2013.01);
(Continued)

(58) Field of Classification Search
CPC ... H04L 63/0428; H04L 65/607; H04N 7/167

USPC .................................. 380/37, 200; 713/160
See application file for complete search history.

(56) References Cited

U.S. PATENT DOCUMENTS 5,361,332 A    11/1994    Yoshida et al.
5,404,436 A    4/1995    Hamilton
(Continued)

FOREIGN PATENT DOCUMENTS

EP    813167 A2    12/1997
EP    936812 A1    8/1999
(Continued)

OTHER PUBLICATIONS

"IBM Closes Cryptolopes Unit," Dec. 17, 2007, CNET News, Retrieved from http://news.cnet.com/IBM-closes-Cryptolopes-unit/2100-1001_3206465.html, 3 pages.
(Continued)

*Primary Examiner* — Dao Ho
(74) *Attorney, Agent, or Firm* — KPPB LLP

(57) ABSTRACT

Systems and methods for providing multimedia content from one process or component to another process or component over an unsecured connection are provided. One embodiment includes obtaining the cryptographic information, extracting the at least partially encrypted video data from the container file to create an elementary bitstream, enciphering the cryptographic information, inserting the cryptographic information in the elementary bitstream, providing the elementary bitstream to a video decoder, extracting the cryptographic information from the elementary bitstream at the video decoder, deciphering the cryptographic information, decrypting the elementary bitstream with the cryptographic information and decoding the elementary bitstream for rendering on a display device using the video decoder.

20 Claims, 8 Drawing Sheets

(51) Int. Cl.
*H04N 21/235* (2011.01)
*H04N 21/236* (2011.01)
*H04N 21/434* (2011.01)
*H04N 21/4405* (2011.01)
*H04N 21/6334* (2011.01)

(52) U.S. Cl.
CPC ..... *H04N21/2351* (2013.01); *H04N 21/23614* (2013.01); *H04N 21/4348* (2013.01); *H04N 21/4405* (2013.01); *H04N 21/63345* (2013.01)

(56) References Cited

U.S. PATENT DOCUMENTS

| | | |
|---|---|---|
| 5,502,766 A | 3/1996 | Boebert et al. |
| 5,509,070 A | 4/1996 | Schull |
| 5,715,403 A | 2/1998 | Stefik |
| 5,754,648 A | 5/1998 | Ryan et al. |
| 5,805,700 A | 9/1998 | Nardone et al. |
| 5,892,900 A | 4/1999 | Ginter et al. |
| 5,999,812 A | 12/1999 | Himsworth |
| 6,031,622 A | 2/2000 | Ristow et al. |
| 6,044,469 A | 3/2000 | Horstmann |
| 6,141,754 A | 10/2000 | Choy |
| 6,155,840 A | 12/2000 | Sallette |
| 6,175,921 B1 | 1/2001 | Rosen |
| 6,195,388 B1 | 2/2001 | Choi et al. |
| 6,282,653 B1 | 8/2001 | Berstis et al. |
| 6,289,450 B1 | 9/2001 | Pensak et al. |
| 6,449,719 B1 | 9/2002 | Baker |
| 6,466,671 B1 | 10/2002 | Maillard et al. |
| 6,510,513 B1 | 1/2003 | Danieli |
| 6,658,056 B1 | 12/2003 | Duruöz et al. |
| 6,807,306 B1 | 10/2004 | Girgensohn et al. |
| 6,810,389 B1 | 10/2004 | Meyer |
| 6,859,496 B1 | 2/2005 | Boroczky et al. |
| 6,956,901 B2 | 10/2005 | Boroczky et al. |
| 6,965,993 B2 | 11/2005 | Baker |
| 7,007,170 B2 | 2/2006 | Morten |
| 7,043,473 B1 | 5/2006 | Rassool et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,242,772 B1 | 7/2007 | Tehranchi |
| 7,328,345 B2 | 2/2008 | Morten et al. |
| 7,349,886 B2 | 3/2008 | Morten et al. |
| 7,356,143 B2 | 4/2008 | Morten |
| 7,376,831 B2 | 5/2008 | Kollmyer et al. |
| 7,406,174 B2 | 7/2008 | Palmer |
| 7,472,280 B2 | 12/2008 | Giobbi |
| 7,478,325 B2 | 1/2009 | Foehr |
| 7,484,103 B2 | 1/2009 | Woo et al. |
| 7,526,450 B2 | 4/2009 | Hughes et al. |
| 7,594,271 B2 | 9/2009 | Zhuk et al. |
| 7,640,435 B2 | 12/2009 | Morten |
| 7,747,853 B2 * | 6/2010 | Candelore .................. 713/160 |
| 7,817,608 B2 | 10/2010 | Rassool et al. |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,249,168 B2 | 8/2012 | Graves |
| 8,261,356 B2 | 9/2012 | Choi et al. |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1 | 10/2012 | Peacock |
| 8,311,115 B2 | 11/2012 | Gu et al. |
| 8,321,556 B1 | 11/2012 | Chatterjee et al. |
| 8,386,621 B2 | 2/2013 | Park |
| 8,412,841 B1 | 4/2013 | Swaminathan et al. |
| 8,456,380 B2 | 6/2013 | Pagan |
| 8,472,792 B2 | 6/2013 | Butt |
| 8,515,265 B2 | 8/2013 | Kwon et al. |
| 8,781,122 B2 | 7/2014 | Chan et al. |
| 8,909,922 B2 | 12/2014 | Kiefer et al. |
| 8,918,636 B2 | 12/2014 | Kiefer et al. |
| 2001/0046299 A1 | 11/2001 | Wasilewski et al. |
| 2002/0051494 A1 | 5/2002 | Yamaguchi et al. |
| 2002/0110193 A1 | 8/2002 | Yoo et al. |
| 2003/0001964 A1 | 1/2003 | Masukura et al. |
| 2003/0002578 A1 | 1/2003 | Tsukagoshi et al. |
| 2003/0021296 A1 * | 1/2003 | Wee et al. .................. 370/474 |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 * | 2/2003 | Wee et al. .................. 713/193 |
| 2003/0093799 A1 | 5/2003 | Kauffman et al. |
| 2003/0152370 A1 | 8/2003 | Otomo et al. |
| 2003/0163824 A1 | 8/2003 | Gordon et al. |
| 2003/0174844 A1 | 9/2003 | Candelore |
| 2003/0185542 A1 | 10/2003 | McVeigh et al. |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0081333 A1 | 4/2004 | Grab et al. |
| 2004/0105549 A1 | 6/2004 | Suzuki et al. |
| 2004/0136698 A1 | 7/2004 | Mock |
| 2004/0139335 A1 | 7/2004 | Diamand et al. |
| 2004/0158878 A1 | 8/2004 | Ratnakar et al. |
| 2004/0202320 A1 | 10/2004 | Amini et al. |
| 2004/0255115 A1 | 12/2004 | DeMello et al. |
| 2005/0038826 A1 | 2/2005 | Bae et al. |
| 2005/0071280 A1 | 3/2005 | Irwin et al. |
| 2005/0114896 A1 | 5/2005 | Hug |
| 2005/0193070 A1 | 9/2005 | Brown et al. |
| 2005/0193322 A1 | 9/2005 | Lamkin et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0036549 A1 | 2/2006 | Wu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0129909 A1 | 6/2006 | Butt et al. |
| 2006/0173887 A1 | 8/2006 | Breitfeld et al. |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0047901 A1 | 3/2007 | Ando et al. |
| 2007/0083617 A1 | 4/2007 | Chakrabarti et al. |
| 2007/0086528 A1 | 4/2007 | Mauchly et al. |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0180125 A1 | 8/2007 | Knowles et al. |
| 2007/0192810 A1 | 8/2007 | Pritchett et al. |
| 2007/0239839 A1 | 10/2007 | Buday et al. |
| 2007/0255940 A1 | 11/2007 | Ueno |
| 2007/0277234 A1 | 11/2007 | Bessonov et al. |
| 2007/0292107 A1 | 12/2007 | Yahata et al. |
| 2008/0120389 A1 | 5/2008 | Bassali et al. |
| 2008/0126248 A1 | 5/2008 | Lee et al. |
| 2008/0137736 A1 | 6/2008 | Richardson et al. |
| 2008/0192818 A1 | 8/2008 | DiPietro et al. |
| 2008/0195744 A1 | 8/2008 | Bowra et al. |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0310454 A1 | 12/2008 | Bellwood et al. |
| 2008/0310496 A1 | 12/2008 | Fang |
| 2009/0031220 A1 | 1/2009 | Tranchant et al. |

(56) References Cited

U.S. PATENT DOCUMENTS

| | | | |
|---|---|---|---|
| 2009/0048852 A1 | 2/2009 | Burns et al. | |
| 2009/0055546 A1 | 2/2009 | Jung et al. | |
| 2009/0060452 A1 | 3/2009 | Chaudhri | |
| 2009/0066839 A1 | 3/2009 | Jung et al. | |
| 2009/0097644 A1 | 4/2009 | Haruki | |
| 2009/0132599 A1 | 5/2009 | Soroushian et al. | |
| 2009/0132721 A1 | 5/2009 | Soroushian et al. | |
| 2009/0132824 A1 | 5/2009 | Terada et al. | |
| 2009/0150557 A1 | 6/2009 | Wormley et al. | |
| 2009/0169181 A1 | 7/2009 | Priyadarshi et al. | |
| 2009/0201988 A1 | 8/2009 | Gazier et al. | |
| 2009/0226148 A1 | 9/2009 | Nesvadba et al. | |
| 2009/0290706 A1 | 11/2009 | Amini et al. | |
| 2009/0290708 A1* | 11/2009 | Schneider | 380/46 |
| 2009/0293116 A1 | 11/2009 | DeMello | |
| 2009/0303241 A1 | 12/2009 | Priyadarshi et al. | |
| 2009/0307258 A1 | 12/2009 | Priyadarshi et al. | |
| 2009/0307267 A1 | 12/2009 | Chen et al. | |
| 2009/0313544 A1 | 12/2009 | Wood et al. | |
| 2009/0313564 A1 | 12/2009 | Rottler et al. | |
| 2009/0328124 A1 | 12/2009 | Khouzam et al. | |
| 2009/0328228 A1 | 12/2009 | Schnell | |
| 2010/0040351 A1 | 2/2010 | Toma et al. | |
| 2010/0074324 A1 | 3/2010 | Qian et al. | |
| 2010/0083322 A1 | 4/2010 | Rouse | |
| 2010/0095121 A1 | 4/2010 | Shetty et al. | |
| 2010/0107260 A1 | 4/2010 | Orrell et al. | |
| 2010/0111192 A1 | 5/2010 | Graves | |
| 2010/0158109 A1 | 6/2010 | Dahlby et al. | |
| 2010/0186092 A1 | 7/2010 | Takechi et al. | |
| 2010/0189183 A1 | 7/2010 | Gu et al. | |
| 2010/0228795 A1 | 9/2010 | Hahn | |
| 2010/0235472 A1 | 9/2010 | Sood et al. | |
| 2011/0047209 A1 | 2/2011 | Lindholm et al. | |
| 2011/0066673 A1 | 3/2011 | Outlaw | |
| 2011/0080940 A1 | 4/2011 | Bocharov et al. | |
| 2011/0082924 A1 | 4/2011 | Gopalakrishnan | |
| 2011/0126191 A1 | 5/2011 | Hughes et al. | |
| 2011/0135090 A1 | 6/2011 | Chan et al. | |
| 2011/0142415 A1 | 6/2011 | Rhyu | |
| 2011/0145726 A1 | 6/2011 | Wei et al. | |
| 2011/0149753 A1 | 6/2011 | Bapst et al. | |
| 2011/0150100 A1 | 6/2011 | Abadir | |
| 2011/0153785 A1 | 6/2011 | Minborg et al. | |
| 2011/0197237 A1 | 8/2011 | Turner | |
| 2011/0225315 A1 | 9/2011 | Wexler et al. | |
| 2011/0225417 A1 | 9/2011 | Maharajh et al. | |
| 2011/0239078 A1 | 9/2011 | Luby et al. | |
| 2011/0246657 A1 | 10/2011 | Glow | |
| 2011/0246659 A1 | 10/2011 | Bouazizi | |
| 2011/0268178 A1 | 11/2011 | Park | |
| 2011/0302319 A1 | 12/2011 | Ha et al. | |
| 2011/0305273 A1 | 12/2011 | He et al. | |
| 2011/0314176 A1 | 12/2011 | Frojdh et al. | |
| 2012/0023251 A1 | 1/2012 | Pyle et al. | |
| 2012/0093214 A1 | 4/2012 | Urbach | |
| 2012/0170642 A1 | 7/2012 | Braness et al. | |
| 2012/0170643 A1 | 7/2012 | Soroushian et al. | |
| 2012/0170906 A1 | 7/2012 | Soroushian et al. | |
| 2012/0170915 A1 | 7/2012 | Braness et al. | |
| 2012/0173751 A1 | 7/2012 | Braness et al. | |
| 2012/0179834 A1 | 7/2012 | Schaar et al. | |
| 2012/0254455 A1 | 10/2012 | Adimatyam et al. | |
| 2012/0260277 A1 | 10/2012 | Kosciewicz | |
| 2012/0278496 A1 | 11/2012 | Hsu | |
| 2012/0307883 A1 | 12/2012 | Graves | |
| 2012/0311094 A1 | 12/2012 | Biderman et al. | |
| 2013/0019107 A1 | 1/2013 | Grab et al. | |
| 2013/0044821 A1 | 2/2013 | Braness et al. | |
| 2013/0046902 A1 | 2/2013 | Villegas Nuñez et al. | |
| 2013/0061040 A1 | 3/2013 | Kiefer et al. | |
| 2013/0061045 A1 | 3/2013 | Kiefer et al. | |
| 2013/0166765 A1 | 6/2013 | Kaufman | |
| 2013/0166906 A1 | 6/2013 | Swaminathan et al. | |
| 2014/0101722 A1 | 4/2014 | Moore | |
| 2014/0189065 A1 | 7/2014 | Schaar et al. | |
| 2014/0201382 A1 | 7/2014 | Shivadas et al. | |
| 2015/0139419 A1 | 5/2015 | Kiefer et al. | |

FOREIGN PATENT DOCUMENTS

| | | |
|---|---|---|
| JP | 2005080204 A | 3/2005 |
| JP | 2006524007 A | 10/2006 |
| JP | 2007174375 A | 7/2007 |
| JP | 2008235999 A | 10/2008 |
| WO | 0165762 A2 | 9/2001 |
| WO | 0237210 A2 | 5/2002 |
| WO | 02054196 A2 | 7/2002 |
| WO | 2004102571 A1 | 11/2004 |
| WO | 2008010275 A1 | 1/2008 |
| WO | 2009065137 A1 | 5/2009 |
| WO | 2010060106 A1 | 5/2010 |
| WO | 2010122447 A1 | 10/2010 |
| WO | 2011068668 A1 | 6/2011 |
| WO | 2011103364 A1 | 8/2011 |
| WO | 2012094171 A1 | 7/2012 |
| WO | 2012094181 A2 | 7/2012 |
| WO | 2012094189 A1 | 7/2012 |
| WO | 2013032518 A2 | 3/2013 |
| WO | 2013032518 A3 | 9/2013 |

OTHER PUBLICATIONS

"Information Technology—Coding of Audio Visual Objects—Part 2: Visual" International Standard, ISO/IEC 14496-2, Third Edition, Jun. 1, 2004, pp. 1-724.

Cloakware Corporation, "Protecting Digital Content Using Cloakware Code Transformation Technology", Version 1.2, May 2002, pp. 1-10.

European Search Report for Application 11855103.5, Search Completed Jun. 26, 2014, 9 pages.

European Search Report for Application 11855237.1, Search Completed Jun. 25, 2014, 9 pages.

International Search Report and Written Opinion for International Application PCT/US2011/066927, International Filing Date Dec. 22, 2011, Report Completed Apr. 3, 2012, Mailed Apr. 20, 2012, 14 pages.

International Search Report and Written Opinion for International Application PCT/US2011/067167, International Filing Date Dec. 23, 2011, Report Completed Jun. 19, 2012, Mailed Jul. 2, 2012, 11 pages.

International Search Report and Written Opinion for International Application PCT/US2011/068276, International Filing Date Dec. 31, 2011, Report Completed Jun. 19, 2013, Mailed Jul. 8, 2013, 24 pages.

International Search Report for International Application No. PCT/US2005/025845, International Filing Date Jul. 21, 2005, Report Completed Feb. 5, 2007, Mailed May 10, 2007, 3 pages.

International Search Report for International Application No. PCT/US2007/063950 filed Mar. 14, 2007, report completed Feb. 19, 2008, Mailed Mar. 19, 2008, 3 pgs.

Written Opinion for International Application No. PCT/US2005/025845, International Filing Date Jul. 21, 2005, Report Completed Feb. 5, 2007, Mailed May 10, 2007, 5 pages.

Written Opinion for International Application No. PCT/US2007/063950, International Filing Date Mar. 14, 2007, Report Completed Mar. 1, 2008, Mailed Mar. 19, 2008, 6 pages.

"Adaptive Streaming Comparison", Jan. 28, 2010, 5 pgs.

"Best Practices for Multi-Device Transcoding", Kaltura Open Source Video, 13 pages.

"IBM Spearheading Intellectual Property Protection Technology for Information on the Internet; Cryptolope Containers Have Arrived", May 1, 1996, Business Wire, Retrieved from http://www.thefreelibrary.com/IBM+Spearheading+Intellectual+Property+Protection+Technology+for...-a018239381, 6 pages.

"Informationweek: Front End: Daily Dose, Internet on Wheels", Jul. 20, 1999, 3 pages.

"Netflix turns on subtitles for PC, Mac streaming", 3 pages.

(56) References Cited

OTHER PUBLICATIONS

"Supported Media Formats", Supported Media Formats, Android Developers, Nov. 27, 2013, 3 pages.
"Thread: SSME (Smooth Streaming Medial Element) config.xml review (Smooth Streaming Client configuration file)", 3 pages.
"Transcoding Best Practices", From movideo, Nov. 27, 2013, 5 pgs.
"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pages.
Akhshabi et al., "An Experimental Evaluation of Rate-Adaptation Algorithms in Adaptive Streaming over HTTP", MMSys'11, Feb. 24-25, 2011, 12 pages.
Anonymous, "Method for the encoding of a compressed video sequence derived from the same video sequence compressed at a different bit rate without loss of data", ip.com, ip.com No. IPCOM000008165D, May 22, 2012, pp. 1-9.
Author Unknown, "Entropy and Source Coding (Compression)", TCOM 570, 1999-9, pp. 1-22.
Author Unknown, "MPEG-4 Video Encoder: Based on International Standard ISO/IEC 14496-2", Patni Computer Systems, Ltd., Publication date unknown, 15 pages.
Author Unknown, "Tunneling QuickTime RTSP and RTP over HTTP", Published by Apple Computer, Inc.: 1999 (month unknown), 6 pages.
Blasiak, Darek, "Video Transrating and Transcoding: Overview of Video Transrating and Transcoding Technologies", Ingenient Technologies, TI Developer Conference, Aug. 6-8, 2002, 22 pages.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pages.
Gannes, "The Lowdown on Apple's HTTP Adaptive Bitrate Streaming", GigaOM, Jun. 10, 2009, 12 pages.
Ghosh, "Enhancing Silverlight Video Experiences with Contextual Data", Retrieved from: http://msdn.microsoft.com/en-us/magazine/ee336025.aspx, 15 pages.
Inlet Technologies, "Adaptive Delivery to iDevices", 2 pages.
Inlet Technologies, "Adaptive delivery to iPhone 3.0", 2 pages.
Inlet Technologies, "HTTP versus RTMP", 3 pages.
Inlet Technologies, "The World's First Live Smooth Streaming Event: The French Open", 2 pages.
Kim, Kyuheon, "MPEG-2 ES/PES/TS/PSI", Kyung-Hee University, Oct. 4, 2010, 66 pages.
Kurzke et al., "Get Your Content Onto Google TV", Google, Retrieved from: http://commondatastorage.googleapis.com/io2012/presentations/live%20to%20website/1300.pdf, 58 pages.
Lang, "Expression Encoder, Best Practices for live smooth streaming broadcasting", Microsoft Corporation, 20 pages.
Levkov, "Mobile Encoding Guidelines for Android Powered Devices", Adobe Systems Inc., Addendum B, source and date unknown, 42 pages.
MSDN, "Adaptive streaming, Expression Studio 2.0", 2 pages.
Nelson, "Arithmetic Coding + Statistical Modeling = Data Compression: Part 1—Arithmetic Coding", Doctor Dobb's Journal, Feb. 1991, Printed from http://www.dogma.net/markn/articles/arith/art1.htm; Printed Jul. 2, 2003, 12 pages.

Nelson, "Smooth Streaming Deployment Guide", Microsoft Expression Encoder, Aug. 2010, 66 pages.
Nelson, Michael, "IBM's Cryptolopes," Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noé, Alexander, "Matroska File Format (under construction!)", Jun. 24, 2007, XP002617671, Retrieved from the Internet: URL:http://web.archive.org/web/20070821155146/www.matroska.org/technical/specs/matroska.pdf [retrieved on Jan. 19, 2011], pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pages.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pages.
Pantos, "HTTP Live Streaming: draft-pantos-http-live-streaming-06", Published by the Internet Engineering Task Force (IETF), Mar. 31, 2011, 24 pages.
Phamdo, "Theory of Data Compression", printed from http://www.data-compression.com/theory.html on Oct. 10, 2003, 12 pages.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pages.
Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.
Siglin, "Unifying Global Video Strategies, MP4 File Fragmentation for Broadcast, Mobile and Web Delivery", Nov. 16, 2011, 16 pages.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", Microsoft Corporation, Mar. 2009, 17 pages.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
International Preliminary Report on Patentability for International Application No. PCT/US2011/068276, International Filing Date Dec. 31, 2011, Issue Date Mar. 4, 2014, 23 pages.
ITS International, "Fleet System Opts for Mobile Server", Aug. 26, 1999, 1 page.
Microsoft, Microsoft Media Platform: Player Framework, "Silverlight Media Framework v1.1", 2 pages.
Microsoft, Microsoft Media Platform: Player Framework, "Microsoft Media Platform: Player Framework v2.5 (formerly Silverlight Media Framework)", 2 pages.
The Official Microsoft IIS Site, Smooth Streaming Client, 4 pages.
Siglin, "HTTP Streaming: What You Need to Know", streamingmedia.com, 2010, 16 pages.
International Search Report and Written Opinion for International Application No. PCT/US2010/56733, International Filing Date Nov. 15, 2010, Completed Jan. 3, 2011, Mailed Jan. 14, 2011, 9 pgs.
Supplementary European Search Report for Application No. EP 10834935, International Filing Date Nov. 15, 2010, Completed May 27, 2014, 9 pgs.

* cited by examiner

ELEMENTARY BITSTREAM CRYPTOGRAPHIC MATERIAL TRANSPORT SYSTEMS AND METHODS

CROSS-REFERENCE TO RELATED APPLICATIONS

The current application is a continuation application of U.S. application Ser. No. 12/946,631 filed Nov. 15, 2010 entitled "Elementary Bitstream Cryptographic Material Transport Systems and Methods" which claims priority to U.S. Provisional Patent Application No. 61/266,982, filed Dec. 4, 2009, the disclosure of which is incorporated herein by reference.

BACKGROUND

The present invention generally relates to digital multimedia distribution systems and more specifically to digital transmission of encrypted multimedia content over an unsecured connection.

Providers of multimedia content can digitize content for distribution via digital communication networks. An important issue faced by a content distribution system is enabling only those customers that have purchased the content to play the content and compartmentalize access to all the stakeholders in the content distribution chain. One approach is to encrypt portions of the content and to issue encryption keys to authorized users that enable encrypted portions of the content to be unencrypted. Layers of keys and protection policies can be used so a single encryption key alone is insufficient for the user to access the content. In a number of systems, users purchase players that possess specified decryption capabilities. Content providers can distribute content to user's owning such a player in an encryption format supported by the player. Complying with a specified protection policy typically involves using an encryption key specified by the manufacturer of the players. In many instances the manufacturer of the players will not reveal the encryption keys used in the specified encryption scheme and likewise the content provider does not want to share the content keys to the manufacturer of the players.

Communications between components or processes of players or playback systems are typically trustworthy and secured. However, when communication or the transporting of information becomes unsecured or untrustworthy, such gaps need to be accounted for and filled. This has become more evident with advent and popularity of open multimedia frameworks. Bi-directional communication requirements and/or run time challenges and authentication requests to fill such gaps have proved to be less than adequate.

There are many ways of securing communication, including ciphering and encryption.

Ciphering is a procedure used to secure data that typically involves using a series of steps to scramble and render the data readable only to the intended audience. The procedure itself does not require an outside source, such as a key, in order to encipher or decipher the data. Rather, data can be properly deciphered by the intended audience so long as deciphering exactly follows the enciphering steps to unravel the data. Encryption is a procedure used to secure data. That typically involves the use of an external input for at least one step in the procedure, such as a key, in order to secure and/or access the data. The external data is used to intentionally manipulate at least one step in the encryption or decryption process, changing the way the data processing for encryption occurs. Generally, without the external data or a corresponding decryption key in an encryption process, a step in a corresponding decryption process cannot properly be executed and the data cannot be properly decrypted.

In the context of digital media, encoding is a procedure by which digital media is represented in a digital format. The format is typically selected to obtain specific benefits during the transportation, playback and storage of the digital media format used. For example, representing the media using fewer bits may be beneficial to transfer data in order to minimize bandwidth usage or storage space. In another example, a media player may only decode or read media in a certain format and therefore the digital media may first be in that format in order to be decoded by that media player.

Decoding is a procedure by which digital media in a format is translated into a format readable by a media player for rendering on a display device. Often, decoding may also reverse processes associated with encoding such as compression. In instances where encryption and/or enciphering have been applied to encoded media, the enciphering process or encryption process typically must be reversed before the encoded media can be decoded.

SUMMARY OF THE INVENTION

Systems and methods are described for taking cryptographic material from a container file and inserting the cryptographic material in an elementary bitstream, where the cryptographic information can then be used to decrypt the elementary bitstream for playback A number of embodiments include obtaining the cryptographic information, extracting the at least partially encrypted video data from the container file to create an elementary bitstream, enciphering the cryptographic information, inserting the cryptographic information in the elementary bitstream, providing the elementary bitstream to a video decoder, extracting the cryptographic information from the elementary bitstream at the video decoder, deciphering the cryptographic information, decrypting the elementary bitstream with the cryptographic information and decoding the elementary bitstream for rendering on a display device using the video decoder.

In a further embodiment, the cryptographic information is obtained from the container file.

In another embodiment, the cryptographic information includes key information and information concerning at least a portion of the at least partially encrypted video data that is encrypted using the key information.

In an additional embodiment, information concerning at least a portion of the at least partially encrypted video data is a reference to a block of encrypted data within an encoded frame of video that is encrypted using the key information.

In a still further embodiment, the cryptographic information inserted in the elementary bitstream is delimited by an identifier and the cryptographic information is inserted before the at least partially encrypted video data encrypted using the key information.

In a still other embodiment, the cryptographic information is extracted using the identifier.

In a still additional embodiment, the decrypting process is performed by using the key information to identify the encrypted portion of video data and decrypting the encrypted video data using the key information.

In a yet further embodiment, cryptographic information inserted in different locations within the elementary bitstream includes different key information.

In a yet other embodiment, the at least partially encrypted video data includes frames of encoded video. In addition, the at least partially encrypted video data includes at least a portion of a plurality of the encoded frames that is encrypted.

In a yet further additional embodiment, the enciphering process and the deciphering process are synchronized such that a delay in excess of a predetermined time between enciphering and deciphering results in the cryptographic information being unrecoverable.

In a still further embodiment again, the enciphering process enciphers data by using a sequence of scrambling processes to scramble data.

In a still other embodiment again, the deciphering process deciphers data by performing the inverse sequence of scrambling processes to the sequence used to scramble the data.

Many embodiments include a demultiplexer configured to extract the at least partially encrypted video data from the container file to create an elementary bitstream, a video decoder configured to decrypt the elementary bitstream using the cryptographic information and decode the elementary bitstream for rendering on a display device. Additionally, the demultiplexer is configured to encipher the cryptographic information and insert the enciphered cryptographic information in the elementary bitstream and the decoder is configured to extract enciphered cryptographic information from an elementary bitstream and to decipher the cryptographic information.

In a further embodiment, the cryptographic information is obtained from the container file.

In another embodiment, the cryptographic information includes key information and information concerning at least a portion of the at least partially encrypted video data that is encrypted using the key information.

In an additional embodiment, the information concerning at least a portion of the at least partially encrypted video data is a reference to a block of encrypted data within an encoded frame of video that is encrypted using the key information.

In a further embodiment again, the demultiplexer is configured to insert the cryptographic information delimited by an identifier in the elementary bitstream and insert the cryptographic information before the at least partially encrypted video data encrypted using the key information.

In another embodiment again, the decoder is configured to extract the cryptographic information using the identifier.

In an additional embodiment again, the decoder is configured to decrypt the portion of the video data encrypted using the key information by identifying the encrypted portion of video data and decrypting the encrypted video data using the key information.

In a still further embodiment again, cryptographic information inserted in different locations within the elementary bitstream includes different key information.

In still another embodiment again, the at least partially encrypted video data includes frames of encoded video. Additionally, at least a portion of a plurality of the encoded frames is encrypted.

In a still additional embodiment, both the demultiplexer and the decoder are configured to be synchronized such that a delay in excess of a predetermined time between enciphering and deciphering results in the cryptographic information being unrecoverable.

In a yet further embodiment, the demultiplexer is configured to encipher data by using a sequence of scrambling processes to scramble data.

In a yet other embodiment, the decoder is configured to decipher data by performing the inverse sequence of scrambling processes to the sequence used to scramble the data.

Numerous embodiments include obtaining the cryptographic information. In addition, the cryptographic information is obtained from the container file. Also, the at least partially encrypted video data includes frames of encoded video and at least a portion of a plurality of the encoded frames is encrypted. Additionally, the cryptographic information includes key information and information concerning at least a portion of the least partially encrypted video data that is encrypted using the key information. Furthermore, the information concerning at least a portion of the at least partially encrypted video data is a reference to a block of encrypted data within an encoded frame of video that is encrypted using the key information and the cryptographic information inserted in different locations within the elementary bitstream includes different key information.

Several embodiments include extracting the at least partially encrypted video data from the container file to create an elementary bitstream. In addition, the cryptographic information inserted in the elementary bitstream is delimited by an identifier and the cryptographic information is inserted before the at least partially encrypted video data encrypted using the key information.

Many embodiments include enciphering the cryptographic information and inserting the cryptographic information in the elementary bitstream. In addition, the cryptographic information is extracted using the identifier.

A number of embodiments include providing the elementary bitstream to a video decoder, extracting the cryptographic information from the elementary bitstream at the video decoder and deciphering the cryptographic information. In addition, the enciphering process and the deciphering process are synchronized such that a delay in excess of a predetermined time between enciphering and deciphering results in the cryptographic information being unrecoverable. Also, the enciphering process enciphers data by using a sequence of scrambling processes to scramble data. Furthermore, the deciphering process deciphers data by performing the inverse sequence of scrambling processes in the sequence used to unscramble data.

Several embodiments include decrypting the elementary bitstream with the cryptographic information. In addition, the decrypting process is performed by using the key information to identify the encrypted portion of video data and decrypting the encrypted video data using the key information.

Many embodiments include decoding the elementary bitstream for rendering on a display device using the video decoder.

DETAILED DESCRIPTION

Systems and methods for providing multimedia content from one process or component to another process or component over an unsecured connection are provided. In several embodiments, the transmission occurs between a demultiplexer and a decoder over an unsecured connection where traditionally such connections are secured. In many embodiments, the transmission occurs on a bi-directional communication path. Embodiments of the present invention do not secure the transmission but rather secure the data being transmitted via the unsecured connection. The transmitted data in a number of embodiments includes an encrypted multimedia bitstream and associated cryptographic material in the bitstream for transmission to a decoder for decryption. In various embodiments, a bi-directional communication path between a demultiplexer and the decoder is not used. Additionally, by allowing the decryption to occur on the decoder the bitstream is protected even if the connection is compromised and an unauthorized component or process intercepts the bitstream.

In various embodiments, frame keys are used to decrypt the bitstream. For example, in the manner described in U.S. Pat. No. 7,295,673 to Grab et al. the disclosure of which is incorporated by reference herein in its entirety. In several embodiments, the frame keys are protected by a cryptographic wrap algorithm that uses a separate series of newly generated keys. The wrapped frame keys are inserted into the encrypted bit stream for deciphering and decoding by the decoder. The cryptographic information in various embodiments includes information to decrypt a video frame or a portion of the video frame. In various embodiments, a time indicator in the form of a frame sequence is also utilized to ensure connection between the demultiplexer and decoder is not being intercepted or spied upon.

The cryptographic information inserted into the elementary bitstream can take any of a variety of forms. In many embodiments, the cryptographic information includes a frame key and/or a reference to a block of encrypted video data. In several embodiments, the cryptographic information contains an index to a frame key or a separate reference to both a frame key and an encrypted block. A number of embodiments provide for first inserting a table of possible keys and still further embodiments provide for sending multiple keys where different keys are used to encrypt different portions of the video.

Figure 1:
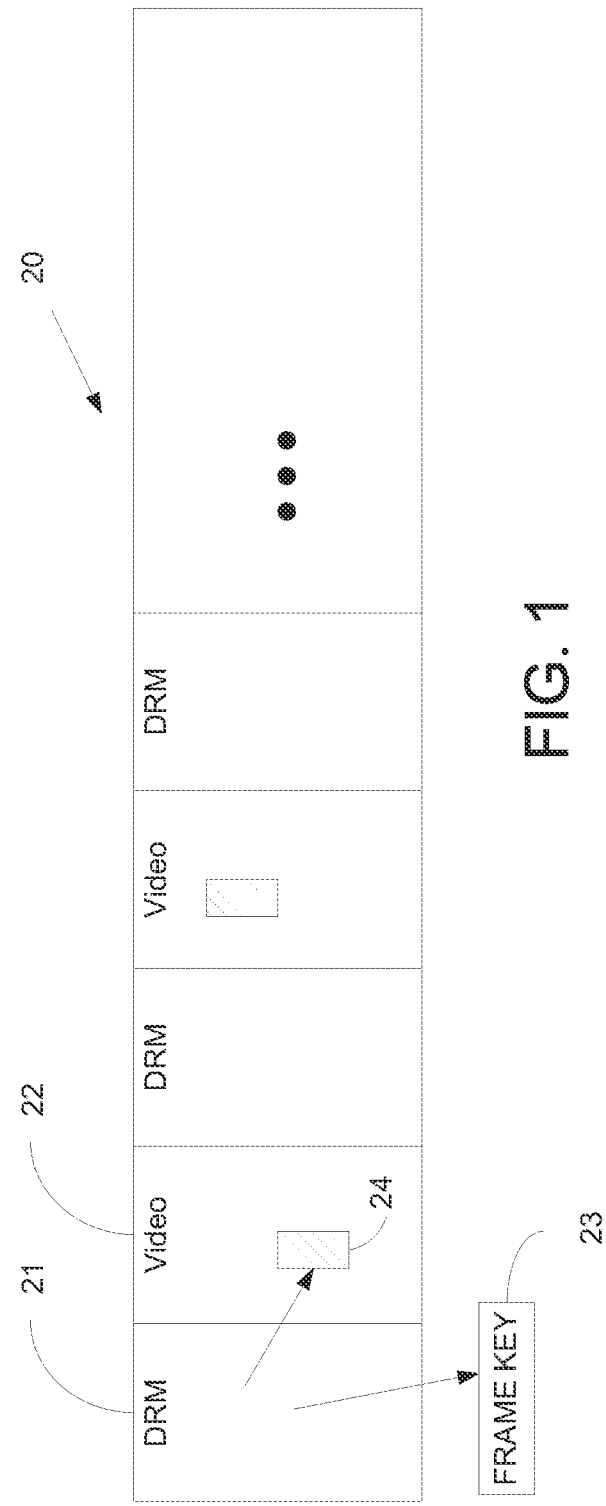
FIG. 1 illustrates a graphical representation of a multimedia container file in accordance with various embodiments of the present invention.

Turning now to the drawings, FIG. 1 represents a multimedia container file 20 including encrypted content, e.g., video. The multimedia container file includes a digital rights management portion 21 preceding associated video portions or chunks 22. The digital rights management portion includes at least one frame key 23 or an index to a frame key in a separately provided table of frame keys, which in many embodiments is encrypted in a way that only enables playback by a particular device and/or user. The digital rights management portion also points to or identifies a specified portion of or an entire video frame within the video chunk 24 that is encrypted. Without first decrypting this encrypted portion of the video chunk, the video content cannot be decoded or displayed. The multimedia container file is supplied to a demultiplexer.

The demultiplexer parses the multimedia container file and transmits portions or chunks of data, e.g., video or audio, to a decoder. However, prior to transmitting the video data, the demultiplexer incorporates or attaches cryptographic material to the video data.

Figure 2:
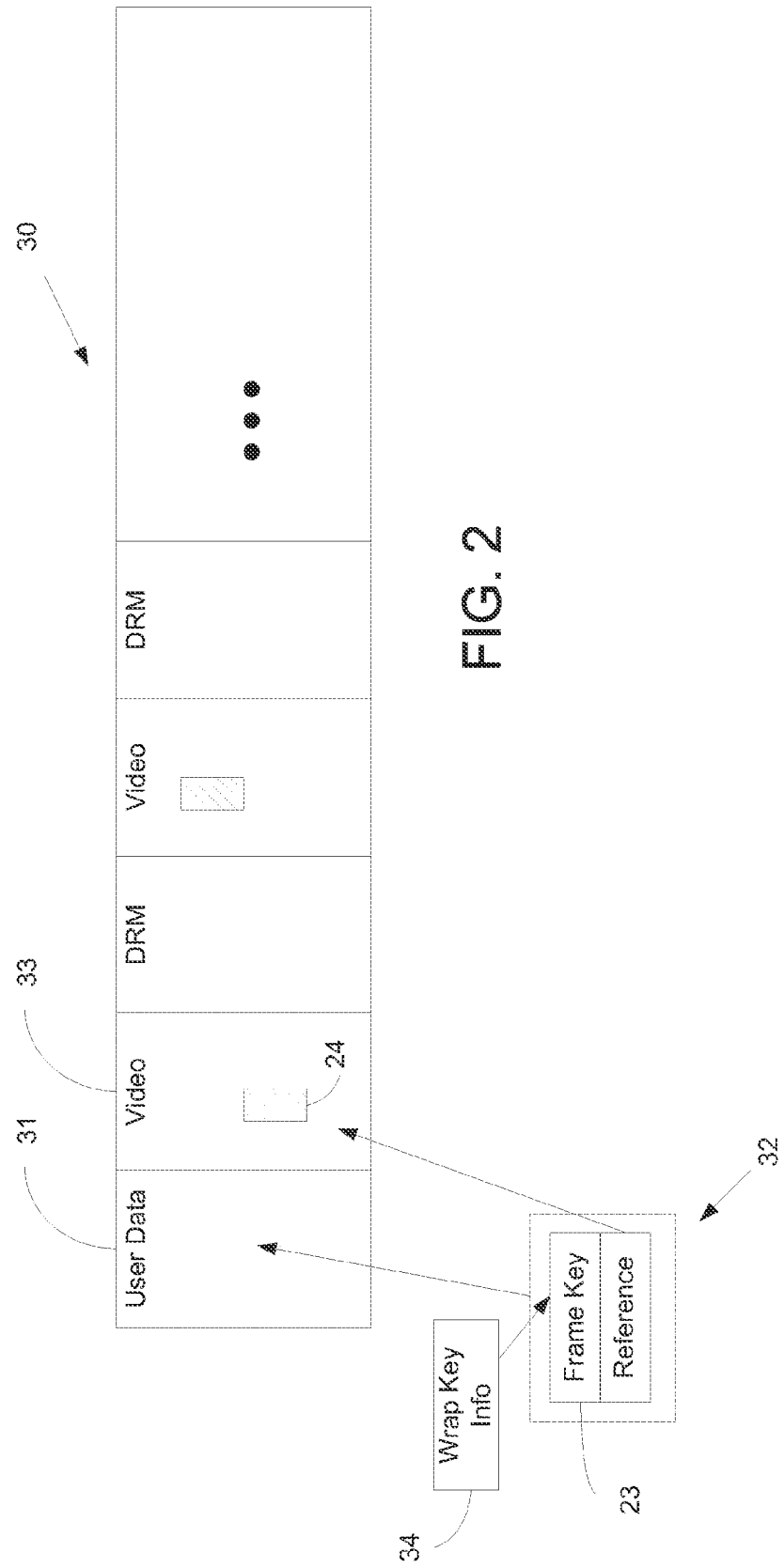
FIG. 2 illustrates a graphical representation of a bitstream with cryptographic material in accordance with various embodiments of the present invention.

FIG. 2 graphically illustrates the generated multimedia bitstream sent to the decoder. The bitstream 30 includes a header or user data 31 that includes cryptographic material 32. In accordance with many embodiments of the invention, the material includes the frame key 23 from the multimedia container file, which is encrypted using a wrap key, and wrap key information 34 to provide synchronization of the demultiplexer to the decoder in order to decipher the cryptographic material. As is discussed below, the wrap key information can take any of a variety of different forms depending upon the specific application including but not limited to information enabling synchronization of wrap key factories and/or the direct transfer of the wrap keys themselves. The associated video data 33 follows.

Figure 3:
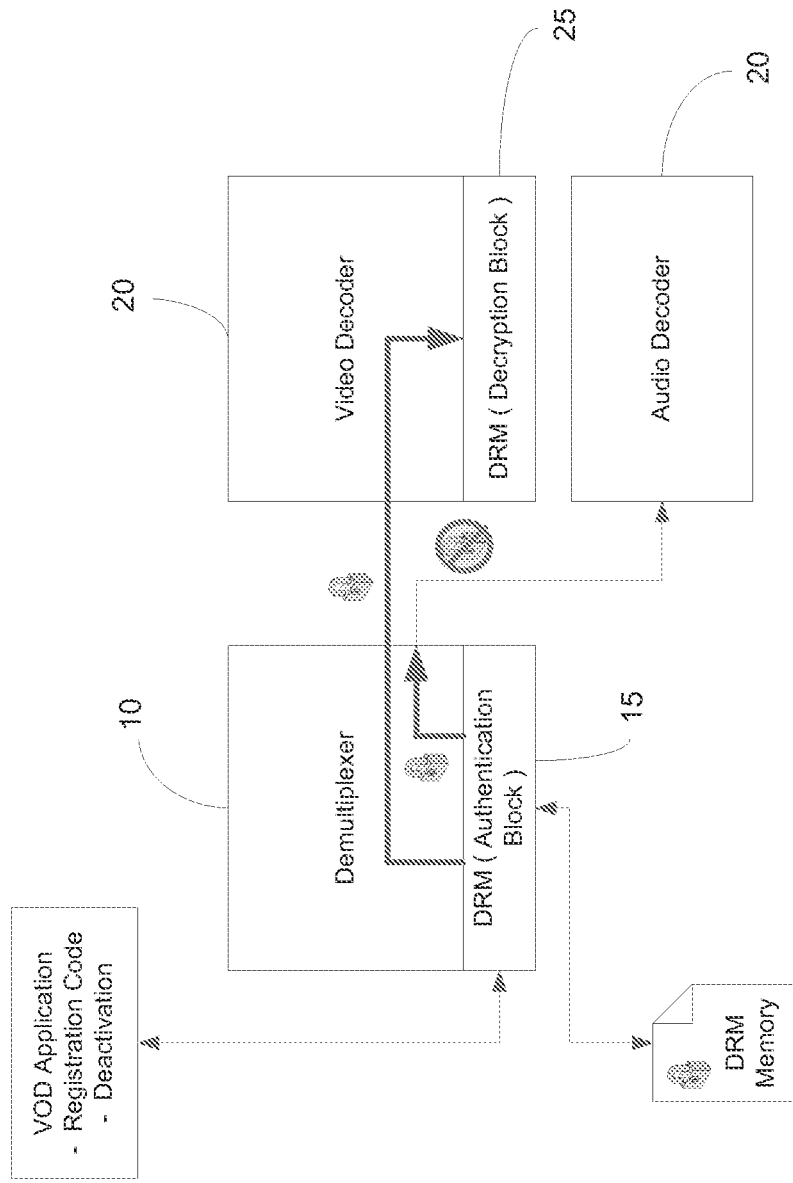
FIG. 3 is a block diagram of a multimedia cryptographic bitstream transport system in accordance with various embodiments of the present invention.

Referring now to FIG. 3, a demultiplexer 10 that receives a multimedia container file that includes video and audio data, portions of which are encrypted, is shown. In one embodiment, the multimedia file conforms to a specific format such as audio video interleave (AVI) or Matroska (MKV). The multimedia file is provided via a disc, flash memory device or another tangible storage medium or streamed or otherwise transmitted to the demultiplexer. The demultiplexer separates portions of the received multimedia data including but not limited to video, audio and encryption data that is supplied to an upstream digital rights management component 15. In various embodiments, the connection between the demultiplexer 10 and the digital rights management component 15 can be secure although need not be depending upon the requirements of the application. The digital rights management component 15 generates cryptographic material and the multimedia bitstream transport that is supplied to a decoder 20. In particular, the demultiplexer 10 transmits video data with cryptographic material to the decoder 20.

The connection between the demultiplexer and the decoder is typically secured. However, in the illustrated embodiment, the connection is not secured. Typically, the multimedia file is authorized and decrypted in a demultiplexer and then transmitted downstream unencrypted to the decoder via an inter-communication data channel. This however can present a security problem due to the high value of the unencrypted but still encoded bitstream that can be captured during transmission. This bitstream is considered high-value since the encoded data can be easily multiplexed back into a container for unprotected and unauthorized views and/or distribution with no loss in the quality of the data. In the illustrated embodiment, the video provided to the decoder 20 by the demultiplexer 10 is at least partially encrypted and the decoder 20 communicates with a downstream digital rights management component 25 that deciphers the cryptographic material. Utilizing the deciphered cryptographic material, the digital rights management component is able to access the encryption data and thereby decrypt and decode the video data for playback.

Figure 4:
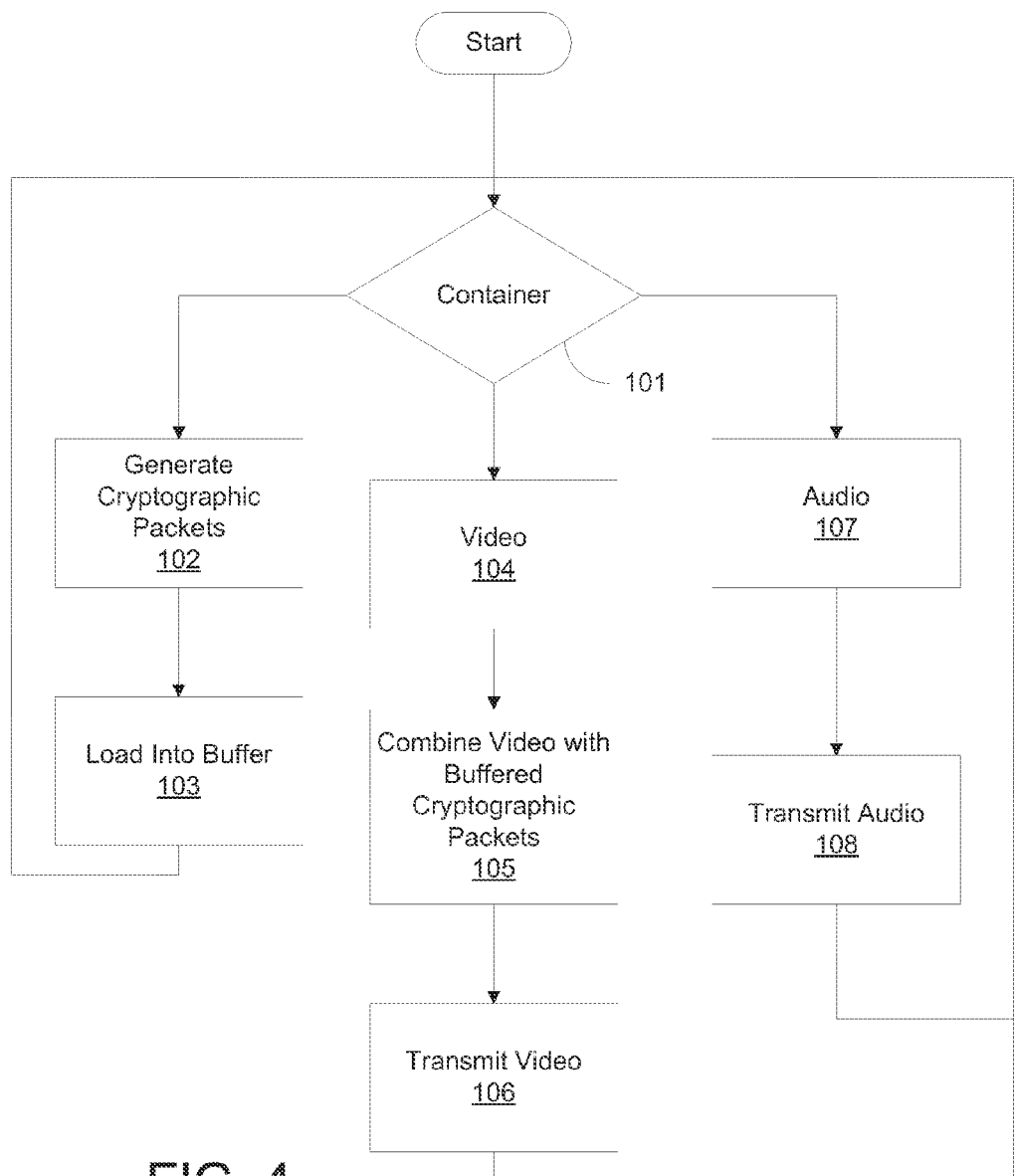
FIG. 4 is a flow diagram of a demultiplex and authentication process in accordance with various embodiments of the present invention.

The general processes of the demultiplexer and the decoder are now described. In FIG. 4, the demultiplexer and authentication process is illustrated in which a multimedia container file is received and portions of which are identified or separated (101). If encryption data is identified, cryptographic packets or material are generated (102) and stored in a temporary buffer (103). However, if video data is identified (104), the cryptographic material stored in the temporary buffer is combined with the video data (105) and then transmitted to a video decoder (106). If audio data is identified (107), the audio data is transmitted (108) to the audio decoder. It should be appreciated that audio or other types of data may also include encryption data and thus associated cryptographic material is generated and combined with the associated data and transmitted to the respective decoder. Also, other types of data may be included in the container file without encryption data and thus is transmitted directly to the associated decoder.

Figure 5:
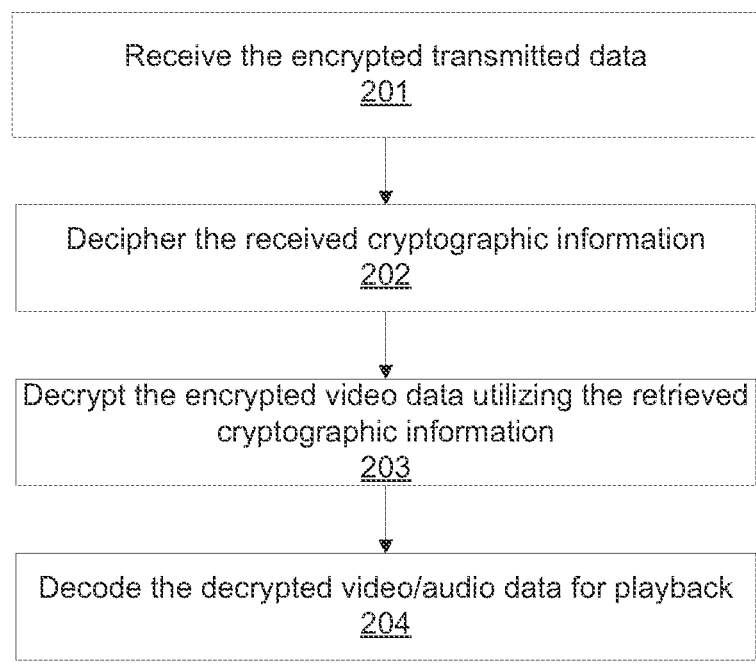
FIG. 5 is a flow diagram of a decoder and decipher process in accordance with various embodiments of the present invention.

In FIG. 5, a decoder and decipher process is illustrated in which the decoder receives video and/or audio data sent from the demultiplexer (201). The decoder deciphers the cryptographic material supplied with the associated data (202). Utilizing the deciphered material, the encrypted data is decrypted (203) and decoded (204) by the decoder for playback.

To further elaborate on the demultiplexer and decoder processes and the bitstream transport system, a more detailed representation of the demultiplexer's and decoder's associated digital rights manager along with the associated processes are illustrated in the remaining figures.

Figure 6:
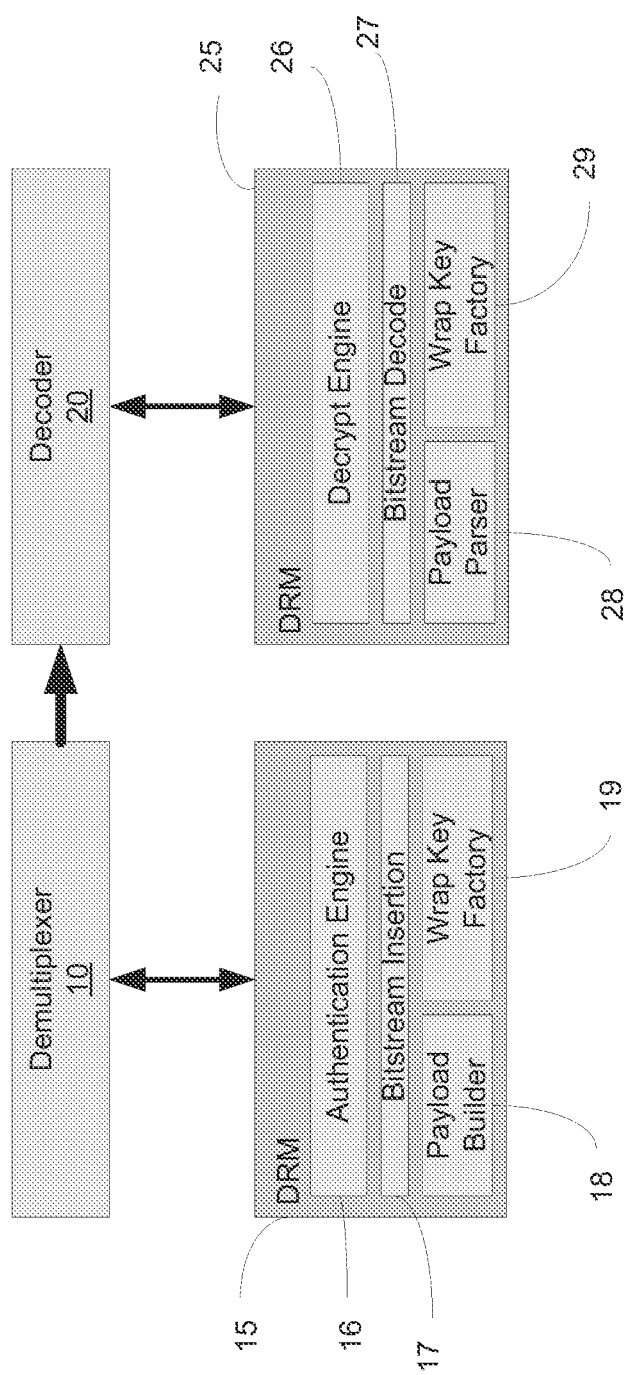
FIG. 6 is a block diagram of a multimedia cryptographic bitstream transport system in accordance with various embodiments of the present invention.

Referring to FIG. 6, the upstream digital rights manager 15 of the demultiplexer 10 includes an authentication engine 16, a bit stream inserter 17, a payload builder 18 and a wrap key factory 19. The downstream digital rights manager 25 of the decoder includes a decrypt engine 26, a bit stream decoder 27, a payload parser 28 and a wrap key factory 29. The authentication engine prepares cryptographic material utilizing the encryption data from the container file and the video data in conjunction with the payload builder 18 and the wrap key factory 19.

The payload builder 18 provides discrete units of cryptographic material in the bitstream delimited by an identifier. On the decoder, the payload parser 28 utilizes the identifiers to extract the discrete units, which are then processed by the decrypt engine 26. In many embodiments, the cryptographic material in one embodiment includes a bitstream frame header along with a cryptographic payload. The cryptographic payload, however, is not dependent on the format of the header of the elementary bitstream, e.g., MPEG-4 or H.264.

In one embodiment, the payload builder 18 inserts a reserved start code identifier along with a cryptographic payload at the front of each video chunk that is demultiplexed. By utilizing a reserved start code, the decrypt engine 26 can pass the entire video data including the inserted cryptographic material to the decoder 20 that simply discards or ignores the cryptographic material. For example, a MPEG-4 compliant decoder discards frames that contain a reserved start code identifier that is included in the bitstream. Accordingly, removal of any of the cryptographic material from the bitstream is not needed to decode the associated data.

The cryptographic payload in one embodiment includes three different packet types: a wrap key, a synchronization payload and a frame payload. The frame payload indicates that the current frame is encrypted and includes key information and a reference to at least a portion of the encoded frame that is encrypted. The frame payload can be used to decrypt the video frame. The synchronization payload is the first packet sent to synchronize the authentication engine of the demultiplexer to the decrypt engine of the decoder. This synchronization ensures that data transmitted from the demultiplexer to the decoder is not being intercepted. The wrap key includes information to unwrap or decipher the transmitted data from the demultiplexer.

The bit stream inserter 17 packages the cryptographic material for transport with the video data. Conversely, the bit stream decoder 27 of the decoder unpacks the cryptographic material from the bitstream. In one embodiment, frame keys are transported in the bitstream and are sent when a key index change is detected by the authentication engine of the demultiplexer. In many embodiments, the decrypt engine of the decoder stores only one frame key and thus frame encryption information sent by the demultiplexer applies to the current frame. If the decrypt engine receives a new frame key from the demultiplexer, the decrypt engine stores the new frame key and uses it to decrypt the next frame. In a number of embodiments, a key table is transmitted and stored in the decrypt engine for reference by subsequent encryption information. In several embodiments, the decoder does not enforce key rotation. In many embodiments, however, the decoder expects a new frame key after a predetermined number of frames in the sequence of frames. In this way, the decrypt engine can identify when supplied frame information is unreliable and terminate the decoding of the multimedia bitstream.

The wrap key factory 19 encrypts or wraps the cryptographic material for transport on the bitstream to the decoder. In one embodiment, the wrap key factory uses a key wrap process based on the Advanced Encryption Standard (AES) and uses the ECB Cipher Mode to provide cryptographic security for wrapping small blocks of data using chaining and cipher feedback loop. The key wrap process is stateless. A corresponding wrap key factory is included with the decoder to unwrap the cryptographic material. Synchronization with the corresponding wrap key factory 29 is used to allow unwrapping of the material without communication back to the demultiplexer (i.e., bi-directional communication) and to prevent unauthorized decoding of the content by, for example, a rogue process intercepting or copying the transmitted content.

Wrap Key Factory

In one embodiment, each of the authentication and decryption blocks (digital rights managers 15, 25) construct a series of predictable transform number sequences using a common heuristic. Subsequently, those numbers are combined with a random value for additional entropy used to contribute toward key material for wrapping keys.

Figure 7:
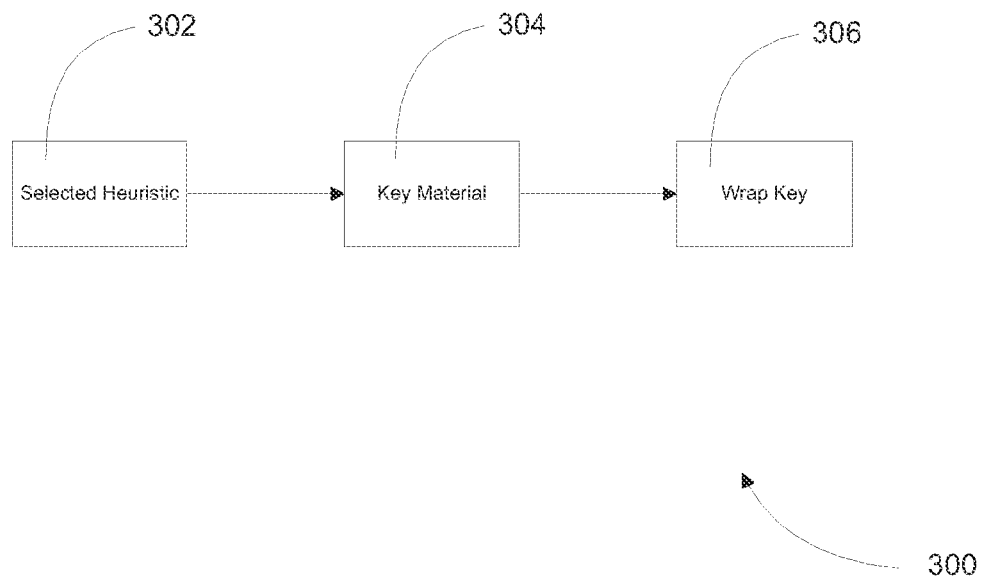
FIG. 7 is a flow diagram of a wrap key generation process in accordance with various embodiments of the present invention.

A flow diagram of a wrap key generation process 300 in accordance with an embodiment of the invention is illustrated in FIG. 7. A selected heuristic (302) is combined with key material (304) to create a wrap key (306).

In accordance with various embodiments, one such heuristic (302) may combine the use of a predictable number sequence generator such that identical transform sequences can be generated by different heuristics even though no information is exchanged. If both authentication and decrypt blocks are created such that the output of the common heuristic are identical, the key material (304) generated from such heuristic will be identical. This may apply in situations where a wrapped key (306) and a selected heuristic (302) are provided. Any process for generating identical encryption keys without exchange of key material can be used as an appropriate heuristic to generate wrapping keys (306) in accordance with embodiments of the invention. Although, some information exchange to enable synchronization between the two wrap key factories can be utilized in accordance with embodiments of the invention.

The two wrap key factories use the same transform sequence. To synchronize the wrap key factories, the sender's wrap key factory selects one heuristic (302) from a predetermined set of heuristics to generate the key material for the next wrap key. The decoder factory will receive a known payload that has been encrypted with the sender's wrap key (306) generated using selected heuristic (302) from the known set of heuristics. The receiver then attempts to decrypt and verify the contents of the payload using each of the predetermined heuristics. If the material matches what is expected, then the receiver has identified the correct heuristic (302). If all the heuristics are exhausted, then this is considered a fatal error and decryption cannot continue.

Initially, the synchronization payload is used to assist the decrypt block in identifying the appropriate transform sequence quickly. Once the decrypt block locates the proper heuristic (302), the decrypt block wrap key factory utilizes that transform sequence for all subsequent transforms. In several embodiments, once a heuristic has exhausted all values, that heuristic will deterministically choose the next heuristic to use.

Run time synchronization is maintained through monotonically incrementing a wrap number that is incremented for each wrap key generated. If an error occurs using a particular wrap key (i.e. unallowable data present in the cryptographic payload), the wrap key factory will regenerate a new wrap key and subsequently increment the wrap number. In one embodiment, the frame payload received by the decrypt block contains a wrap number element. On the decrypt block, this wrap number element is compared with the internal wrap number of the decrypt block to determine if the current wrap key needs to be skipped. In one embodiment, the wrap key includes data fed into a cryptographic digest. The resulting bytes from the digest are then used to create an AES key. A new wrap key will be generated for each payload that is wrapped.

Bitstream Data Insertion

Figure 8:
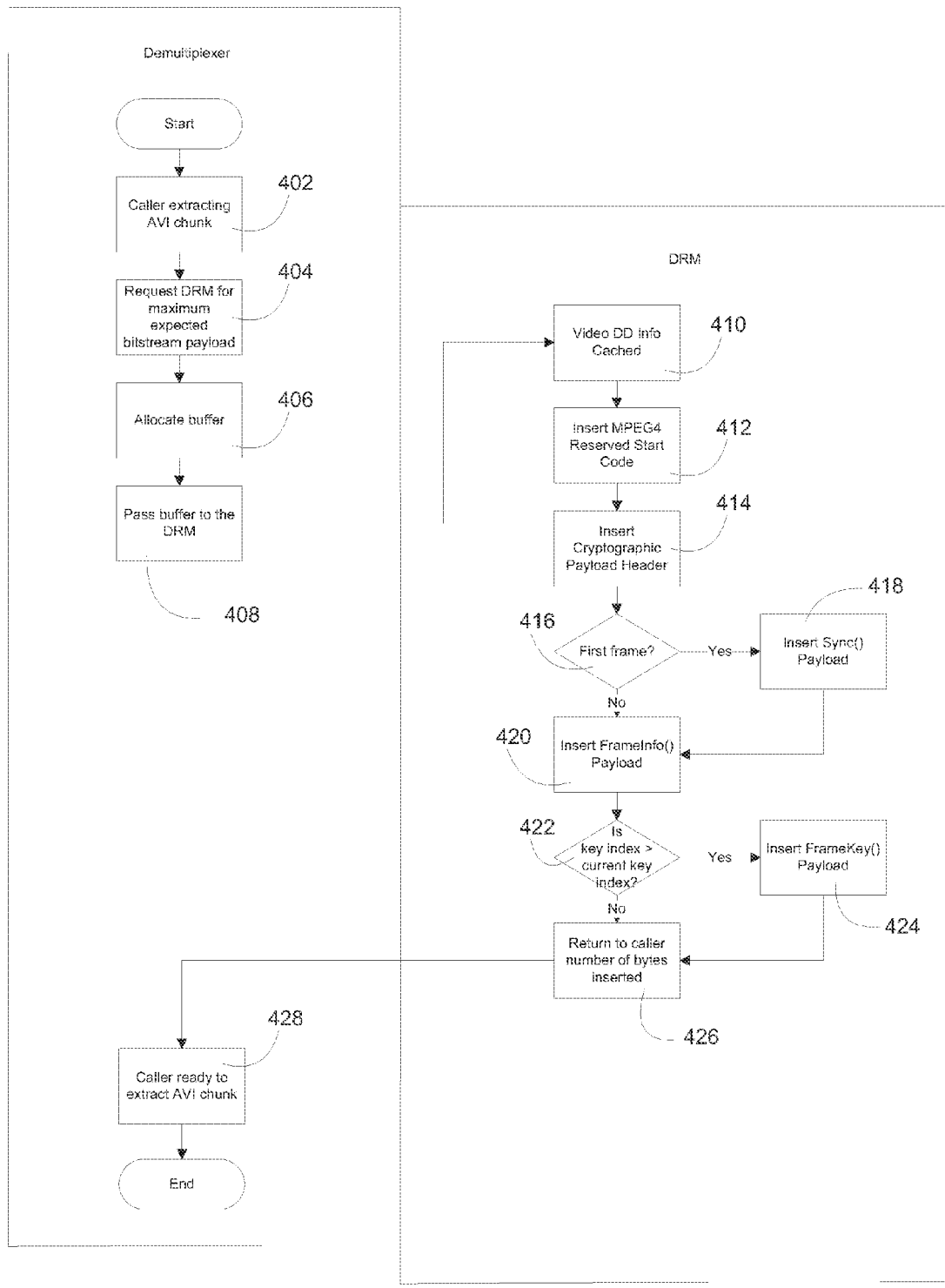
FIG. 8 is a flow diagram of a bitstream insertion process in accordance with various embodiments of the present invention.

A flow diagram of a bitstream insertion process 400 utilized with respect to video data extracted from an AVI container in accordance with an embodiment of the invention is illustrated in FIG. 8. In the demultiplexer, a caller begins extraction (402) of a relevant AVI chunk and requests (404) the DRM for the maximum expected bitstream payload. The demultiplexer then uses the information from the DRM to allocate (406) space in a buffer and passes (408) the buffer to the DRM. Next on the DRM, the video DD info is cached (410). The video DD info may be a data segment in a file container describing the data contained in a single block of container data, such as all of the video frame data in a single AVI chunk. Encrypted frames may have a DD info which contains information relating to the security features of the frame. The MPEG4 reserved start code is inserted (412) into the buffer and then the cryptographic payload header is inserted (414) into the buffer. A decision (416) is then made as to whether the chunk is the first frame. If the chunk is the first frame, then a Sync( ) payload is inserted (418) and a FrameInfo( ) payload is inserted (420). The Sync( ) payload may include the wrap key synchronization payload to synchronize the wrap keys. The FrameInfo( ) payload may include the cryptographic offset and length of information relating to data security in the video data, possibly as part of the DD Info data. If the chunk is not the first frame, then only the FrameInfo( ) payload is inserted (420). Then, a decision (422) is made as to whether the key index is greater than the current key index. If the key index is greater than the current key index, a FrameKey( ) payload is inserted (424) in the buffer and then the number of bytes inserted into the buffer is returned (426) to the caller by the DRM. The FrameKey( ) payload may include the payload containing the next frame key. If the key index is not lower than the current key index, then the DRM returns (426) the number of bytes inserted in the buffer to the caller. Next, the demultiplexer, is ready to extract (428) the AVI chunk. Through this process, DD info awareness occurs before the demultiplexer extracts the video chunk into the buffer for transmission to the decoder.

In various embodiments, bitstream data insertion occurs in the authentication block of the demultiplexer. The digital rights manager in one embodiment first receives the container's encryption data and temporarily stores or caches the information. The cached encryption data contains the information for the next video chunk. From this information, the digital rights manager can determine the proper bitstream payload to insert, if any. To reduce memory copies, the digital rights manager inserts the bitstream payload before extracting the chunk from the container.

Based on the cached encryption data chunk, the digital rights manager can detect frame key changes. If the frame key index has not changed since the last cached encryption data, no key material is sent. In one embodiment, the encryption data is always transported if there is cached encryption data in the digital rights manager. On the first payload, there will be a synchronization payload to allow the decrypt block to synchronize the wrap sequence. The frame information payloads in one embodiment follow the synchronization payload. It should be appreciated that not all payloads are required to appear in each decrypt block. Furthermore, the processes similar to those described above with reference to FIG. 8 can also be used with respect to other container formats including but not limited to MKV container files.

Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed is:

1. A method of playing back encrypted video on a playback device, where at least partially encrypted video data is contained within a container file and can be used to create an elementary bitstream using cryptographic information, which can be used to decrypt the at least partially encrypted video data, the method comprising:

extracting at least partially encrypted video data from a container file to create an at least partially encrypted elementary bitstream using a processor configured by a demultiplexer process;

obtaining cryptographic information using the processor configured by the demultiplexer process, where the cryptographic information comprises:
key information; and
a reference to a block of encrypted data within an encoded frame of video in the encrypted video data that is encrypted using the key information;

enciphering the cryptographic information using the processor configured by the demultiplexer process;

inserting the cryptographic information in the elementary bitstream using the processor configured by the demultiplexer process, where the cryptographic information is delimited by an identifier;

providing the elementary bitstream in which the enciphered cryptographic information is inserted to a video decoder process using the processor configured by the demultiplexer process;

extracting the cryptographic information from the elementary bitstream using a processor configured by a video decoder process;
deciphering the enciphered cryptographic information using the processor configured by the video decoder process;
decrypting the elementary bitstream with the cryptographic information using the processor configured by the video decoder process; and
decoding the decrypted elementary bitstream for rendering on a display device using the processor configured by the video decoder process.

2. The method of claim 1, wherein the cryptographic information is obtained from the container file.

3. The method of claim 1, wherein
the cryptographic information is inserted before the at least partially encrypted video data encrypted using the key information.

4. The method of claim 3, wherein the cryptographic information is extracted using the identifier.

5. The method of claim 4, wherein the decrypting process is performed by using the key information to identify the encrypted portion of video data and decrypting the encrypted video data using the key information.

6. The method of claim 5, wherein cryptographic information inserted in different locations within the elementary bitstream includes different key information.

7. The method of claim 1, wherein the at least partially encrypted video data comprises:
frames of encoded video;
wherein at least a portion of a plurality of the encoded frames is encrypted.

8. The method of claim 1, wherein the enciphering process and the deciphering process are synchronized such that a delay in excess of a predetermined time between enciphering and deciphering results in the cryptographic information being unrecoverable.

9. The method of claim 8, wherein the enciphering process enciphers data by using a sequence of scrambling processes to scramble data.

10. The method of claim 9, wherein the deciphering process deciphers data by performing the inverse sequence of scrambling processes to the sequence used to scramble the data.

11. A system for playback of encrypted video, where at least partially encrypted video data is contained within a container file and can be used to create an elementary bitstream using cryptographic information, which can be used to decrypt the at least partially encrypted video data, comprising:
a demultiplexer configured to extract at least partially encrypted video data from a container file containing at least partially encrypted video data to create an at least partially encrypted elementary bitstream; and
a video decoder configured to decrypt the elementary bitstream using the cryptographic information and decode the decrypted elementary bitstream for rendering on a display device;
wherein the demultiplexer is configured to obtain cryptographic information, encipher the cryptographic information, and insert the enciphered cryptographic information into the elementary bitstream, where the cryptographic information is delimited by an identifier and the cryptographic information comprises:
key information; and
a reference to a block of encrypted data within an encoded frame of video in the encrypted video that data is encrypted using the key information; and
wherein the decoder is configured to extract enciphered cryptographic information from an elementary bitstream in which the enciphered cryptographic information is inserted, to decipher the cryptographic information, to decrypt the elementary bitstream using the cryptographic information, and to decode the decrypted elementary bitstream for rendering on a display device.

12. The system of claim 11, wherein the cryptographic information is obtained from the container file.

13. The system of claim 11, wherein the demultiplexer is further configured to:
insert the cryptographic information before the at least partially encrypted video data encrypted using the key information.

14. The system of claim 13, wherein the decoder is configured to extract the cryptographic information using the identifier.

15. The system of claim 14, wherein the decoder is configured to decrypt the portion of the video data encrypted using the key information by identifying the encrypted portion of video data and decrypting the encrypted video data using the key information.

16. The system of claim 15, wherein cryptographic information inserted in different locations within the elementary bitstream includes different key information.

17. The system of claim 11, wherein the at least partially encrypted video data comprises:
frames of encoded video;
wherein the at least a portion of a plurality of the encoded frames is encrypted.

18. The system of claim 11, wherein both the demultiplexer and the decoder are configured to be synchronized such that a delay in excess of a predetermined time between enciphering and deciphering results in the cryptographic information being unrecoverable.

19. The system of claim 18, wherein the demultiplexer is configured to encipher data by using a sequence of scrambling processes to scramble data.

20. The system of claim 19, wherein the decoder is configured to decipher data by performing the inverse sequence of scrambling processes to the sequence used to scramble the data.

* * * * *